US006574178B2

(12) United States Patent
Tieke et al.

(10) Patent No.: US 6,574,178 B2
(45) Date of Patent: Jun. 3, 2003

(54) METHODS AND DEVICES FOR RECORDING MARKS ON A RECORDING SURFACE OF AN OPTICAL RECORD CARRIER

(75) Inventors: Benno Tieke, Eindhoven (NL); Robert Woudenberg, Eindhoven (NL)

(73) Assignee: Koninklijke Electronics N.V., Eindhoven (NL)

( * ) Notice: Subject to any disclaimer, the term of this patent is extended or adjusted under 35 U.S.C. 154(b) by 102 days.

(21) Appl. No.: 09/840,219

(22) Filed: Apr. 23, 2001

(65) Prior Publication Data
US 2001/0043540 A1 Nov. 22, 2001

(30) Foreign Application Priority Data
May 11, 2000 (EP) .............................. 00201680

(51) Int. Cl.[7] .................................. G11B 7/00
(52) U.S. Cl. .................... 369/59.11; 369/116; 369/47.5
(58) Field of Search ............... 369/47.1, 47.5, 369/47.52, 53.1, 53.11, 59.1, 59.11, 59.12, 116

(56) References Cited

U.S. PATENT DOCUMENTS 4,894,816 A    1/1990  Sukeda et al.
5,745,467 A *  4/1998  Sakaue et al. .............. 369/116
5,790,482 A *  8/1998  Saga et al. ................ 369/47.51
6,153,063 A * 11/2000  Yamada et al. ............. 369/275.5

FOREIGN PATENT DOCUMENTS

WO        WO 9930316        6/1999

OTHER PUBLICATIONS

Compact Disc Recordable; Sony, Philips; Recordable Compact Disc Systems; Part II; CD-R, Ver. 3.1; System Description Dec. 1998.

* cited by examiner

Primary Examiner—Muhammad Edun
(74) Attorney, Agent, or Firm—Michael E. Belk

(57) ABSTRACT

The invention relates to methods and devices for forming marks and lands by applying a radiation beam (32) to a recording surface (301) of an optical record carrier (30). Recording strategies are proposed for recording information at high recording speeds. An intermediate power level ($P_1$, $P_2$) is introduced in between the bottom power level ($P_0$) and the write power level ($P_w$), its value being dependent on the length of the preceding land (151, 152, 153). A raised write power level ($P_{R1}$, $P_{R2}$) is also proposed, its value being dependent on the length of the mark to be recorded (241, 242, 243).

12 Claims, 3 Drawing Sheets

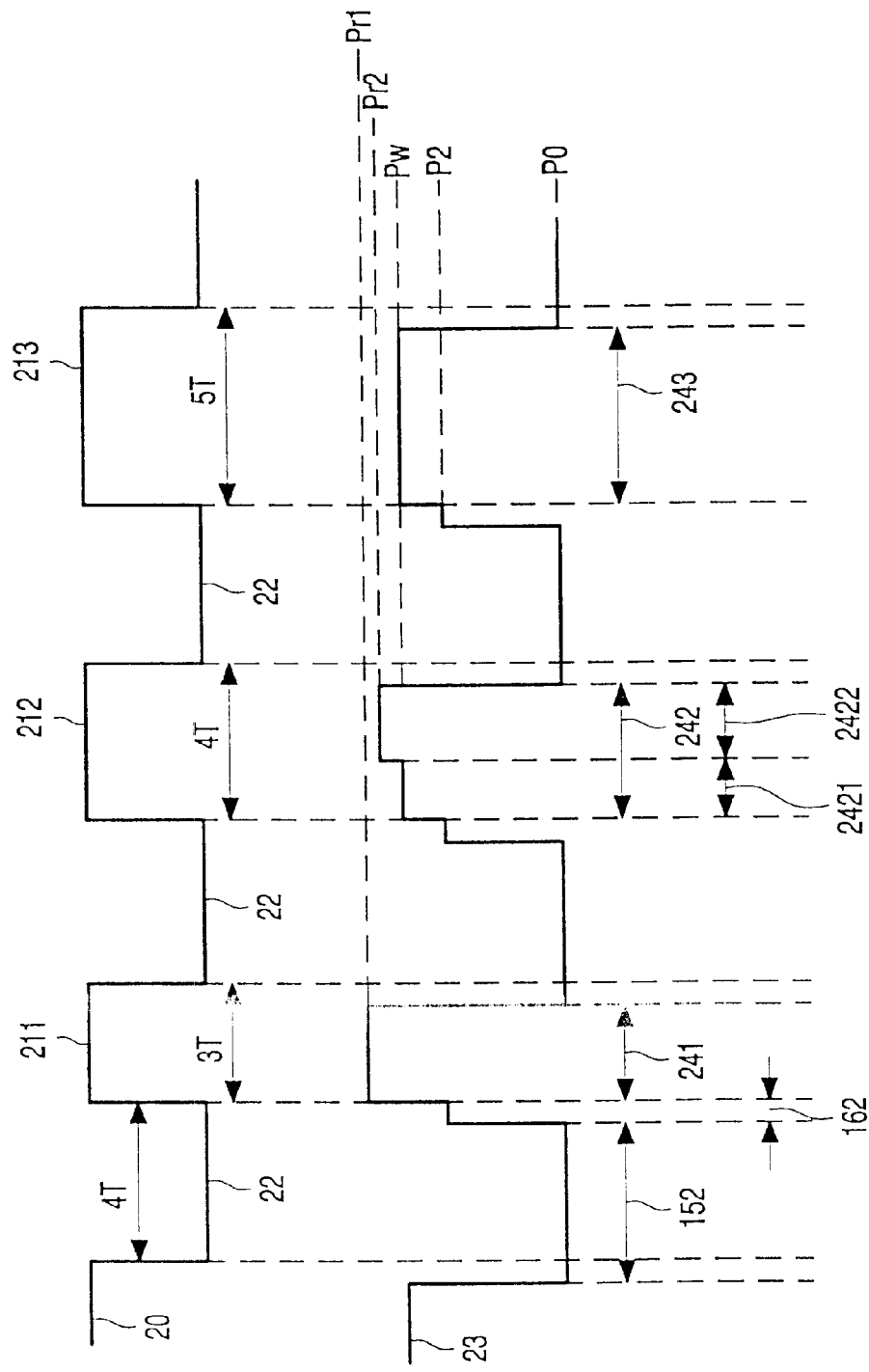

METHODS AND DEVICES FOR RECORDING MARKS ON A RECORDING SURFACE OF AN OPTICAL RECORD CARRIER

BACKGROUND OF THE INVENTION

1. Technical Field

The invention relates to an optical record carrier recording method for forming marks and lands by applying a radiation beam to a recording surface of an optical record carrier, the radiation beam for each mark to be recorded being set to at least one write power level capable of forming a mark during a write power irradiation period and being set for each land section between the marks, to at least one bottom power level incapable of forming a mark during a bottom power irradiation period.

The invention also relates to an optical record carrier recording method for forming marks and lands by applying a radiation beam to a recording surface of an optical record carrier, the marks having a time length of nT, where T represents the time length of one period of a reference clock in a data signal and n represents a predetermined natural number.

The invention also relates to optical recording devices for carrying out such methods.

2. Related Art

A recording method of the kind set forth in the preamble is know from the Compact Disc Recordable (CD-R) System Description (also know as the Orange-book). A mark is formed by applying a radiation beam having a write power level, $P_w$, to a recording surface of an optical record carrier during a write power irradiation period. The time length of the write power irradiation period depends on the length of the mark to be recorded. The length of a mark is represented by a parameter nT, where T represents the time length of one period of a reference clock in a data signal and n represents a predetermined natural number. For a CD-R system n is in an range from 3 to 11.

The nominal constant linear velocity speed (CLV-speed) of the CD system is between 1.2 and 1.4 m/sec. In a CD-R system this nominal constant linear velocity speed will result in an average EFM (Eight to Fourteen Modulation) clock frequency of 4.3218 MHz. However the system is also specified to run at higher speeds such as for example four times the nominal speed (4×). Running at higher speeds, the write power level is enhanced with an extra power, $\Delta P$, at the beginning of the write power irradiation period. By applying this extra power, the degradation of the jitter due to of the high speed is somewhat reduced. The jitter is the standard deviation of the time difference between level transitions in a digitized read signal and the corresponding transitions in a clock signal, the time difference being normalized by the duration of one period of said clock.

It is a drawback of the known method that it does not allow a sufficient reduction of the jitter in the read signal obtained from reading marks recorded by using the know method, especially when the marks are recorded at high speeds such as, for example, eight times the nominal speed (8×).

SUMMARY OF THE INVENTION

It is an object of the invention to provide a method of recording marks of the kind described in the opening paragraph which offers reduced jitter.

This object is achieved by a method as described in the preamble which is characterized in that the radiation beam is set to at least one intermediate power level after the bottom power irradiation period and before the write power irradiation period, the intermediate power level being higher than the bottom power level and being set in accordance with a time length of the preceding bottom power irradiation period.

Marks are recorded on a recording surface by applying a radiation beam having a sufficiently high write power level to a location on the recording surface of an optical record carrier, thus temporarily increasing the local temperature of the recording surface. However, when recording a mark, the temperature of the actual location on the recording surface is pre-heated because of the recording of a previous mark. This so-called pre-heat effect results in an increase of particularly the leading edge jitter of the mark to be recorded. Furthermore, the recording of a mark slows down the cooling-down of the location of the previously recorded mark. This so-called post-heat effect results in an increase of particularly the trailing edge jitter of the previously recorded mark.

The influence of these thermal interference effects (that is, the pre-heat and the post-heat effect) depends on the distance between the actual location on the recording surface where a mark is to be recorded and the location of the previously recorded mark. Therefore, the influence of the thermal interference effects depends on the length of the land, $l_L$, between the marks. This length can be expressed in the time length of the bottom power irradiation period, $t_L$, because of the relation: $t_L = l_L$/actual CLV-speed.

The thermal interference effects can be reduced by introducing an intermediate power level after the bottom power irradiation period and before the write power irradiation period, the intermediate power level being dependent on the time length, $t_L$, of the preceding bottom power irradiation period.

Version of the method according to the invention is characterized in that an intermediate power level following a first bottom power irradiation period having a time length of (n+1)T is set to be larger than or equal to an intermediate power level following a second bottom power irradiation period having a time length of nT.

The thermal interference effects between two marks decrease when the distance between the marks increases. Therefore the compensation for these effects obtained by introducing the intermediate power level needs to be less for larger distances than for shorter distance. Therefore, the intermediate power level will be closer to the write power level in the case of long distances between the marks.

A preferred version of the method according to the invention is characterized in that an intermediate power level following a first bottom power irradiation period having a time length of 3T is set within a range of from 0.50 to 0.80 times the write power level, that an intermediate power level following a second bottom power irradiation period having a time length of 4T is set within a range of from 0.75 to 0.95 times the write power level, and that an intermediate power level following a third bottom power irradiation period having a time length of mT, where m represents a predetermined natural number larger than 4, is set so as to be substantially equal to the write power level.

From experiments it was concluded that, when recording at a speed of eight (8×) to sixteen (16×) times the nominal speed, reduction of the jitter is obtained when the intermediate power level is within the above mentioned ranges. A particularly reduction of the jitter is obtained when an intermediate power level following a first bottom power irradiation period having a time length of 3T is set so as to be substantially equal to 0.65 times the write power level (11) and when an intermediate power level following a second bottom power irradiation period having a time length of 4T is set so as to be substantially equal to 0.85 times the write power level. However, the optimal setting of the intermediate power levels depend on properties of the optical record carrier used. Therefore, it is suggested that an Optimal Power Calibration (OPC) method should be used to determine the optimal settings of the intermediate power levels for each individual optical record carrier.

Version of the method according to the invention is characterized in that the time length of the intermediate power irradiation period is substantially equal to ¼T.

Although the time length of the intermediate power irradiation period may be set to any value, such as for example ⅛T, ½T and 1T, results are obtained for all recording speed when the intermediate power irradiation period is set so as to be substantially equal to ¼T.

At the nominal CLV-speed T represents a time length of 231.4 ns (=1/40.3218 MHz). At a higher speed of eight times the nominal speed (8×) T represents a time length of 28.9 ns. An intermediate power level maintained for a time length of 7.2 ns (=T/4 at eight times nominal speed) can be easily and accurately obtained by means of contemporary electronics. Alternative methods for reducing the jitter employ a time shift of the leading-edge of the write power level. These time shifts typically occur in steps of T/20. At nominal speed these time shifts of 11.6 ns can also be obtained using contemporary electronics. However, at eight times the nominal speed (8×) these time shifts would be in the range of 1.4 ns, being a value being difficult to obtain accurately. At an even higher recording speed of sixteen times the nominal speed (16×), the time shifts would be in the range of 0.7 ns while the intermediate power level should be maintained for a time length of 3.6 ns The object is also achieved by means of a method according to the invention which has the features as described in claim 7.

A further reduction of the jitter is obtained by applying a raised write power level when recording the marks, the raised power level being set in accordance with the time length of the mark to be recorded. For the shorter marks the raised power level is applied over the entire write power irradiation period. For the somewhat longer marks the raised power level is only applied to a portion at the end of the write power irradiation period. The time length of this portion may be equal for all marks or, alternatively, can be made dependent on the length of the mark to be recorded. For the longer marks no raised power level is applied.

A preferred version of the method according to the invention has the features as described in claim 8.

From experiments it was concluded that reduction of the jitter is obtained when the raised write power levels are within the specified ranges. A particularly reduction of the jitter is obtained when the first raised write power level, when recording a mark having a time length of 3T, is set so as to be substantially equal to 1.10 times the write power level and when the second raised write power level when recording a mark having a time length of 4T, is set so as to be substantially equal to 1.04 times the write power level.

Although the range specified for the first raised write power level overlaps with the range specified for the second raised write power level, the first raised power level is in general set to a higher value in comparison with the second raised write power level.

It is a further object of the invention to provide an optical recording device for carrying out the methods according to the invention.

This object is achieved by an optical recording device which has the features as described in claim 9. This object is also achieved by providing an optical recording device which has the features as described in claim 11.

Although the invention is explained by using a CD-R system as an example, it will be apparent to those skilled in the art that the invention may also be applied to alternative optical recording systems.

BRIEF DESCRIPTION OF THE DRAWINGS

The objects, features and advantages of the invention will be apparent from the following, more specific description of embodiments of the invention as illustrated in the accompanying drawings; therein:

FIGS. 2A and 2B show diagrams of a second version of a method according to the invention.

DETAILED DESCRIPTION OF THE INVENTION

Figures 1A, 1B:
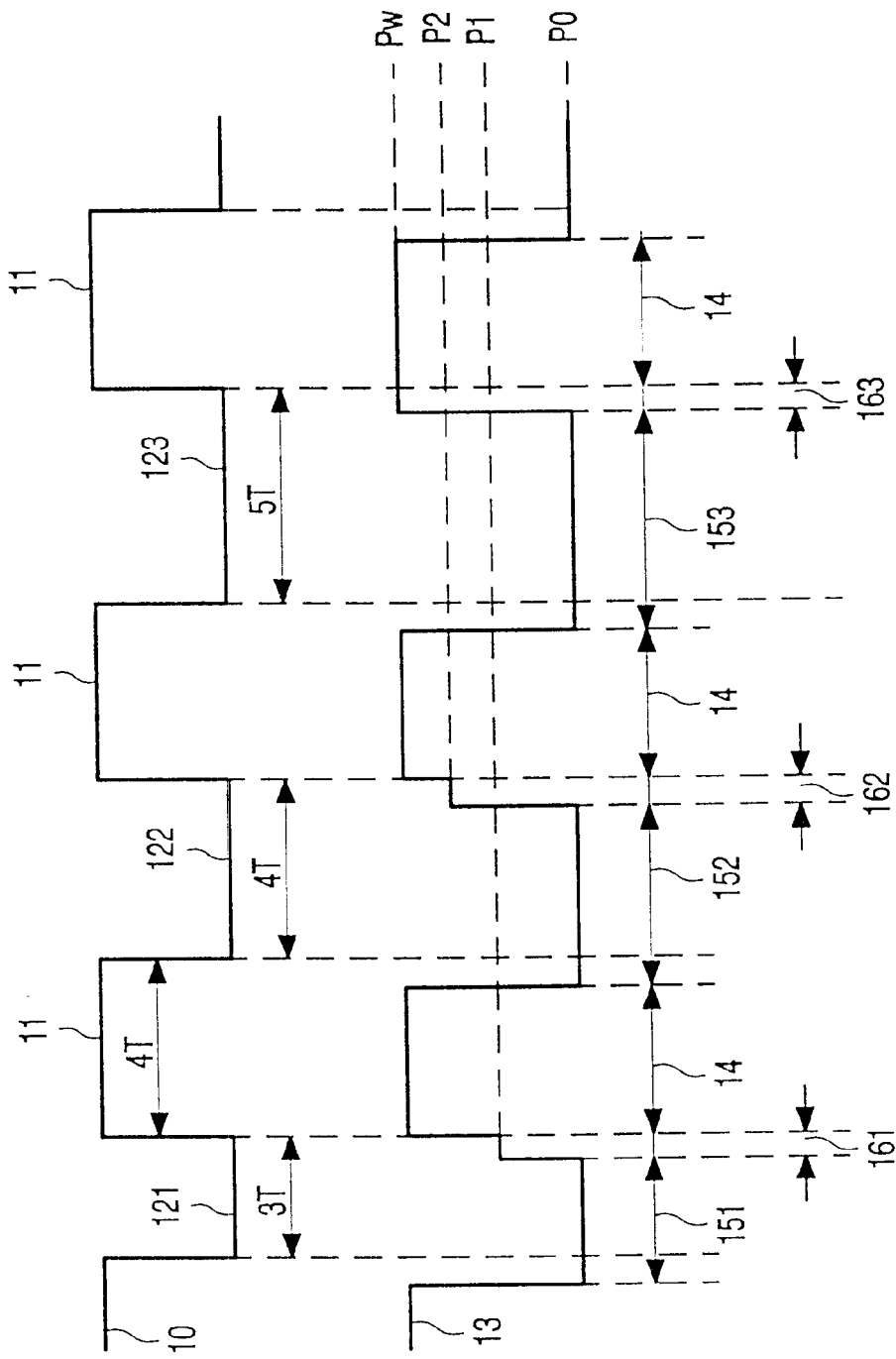
FIGS. 1A and 1B show diagrams of a first version of a method according to the invention.

FIG. 1a shows a data signal 10. When this data signal 10 is recorded on an optical record carrier, the 'high' periods 11 are recorded as marks and the 'low' periods 121, 122 and 123 are recorded as lands (e.g. unwritten areas between the marks). The time lengths of these periods in the data signal are expressed by the number of periods, T, of a reference clock in the data signal. In this example, the time length of the 'high' periods 11 is 4T. The time length of the 'low' periods 121, 122, and 123 is 3T, 4T and 5T, respectively.

FIG. 1b shows a control signal 13 for controlling the power of the radiation beam. When a mark is recorded, the control signal 13, and hence the power of the radiation beam, is set to a write power level $P_w$ during a write power irradiation period 14. The duration of the write power irradiation period 14 is related to the corresponding 'high' period 11 in the data signal 10. In this example the duration of the write power irradiation period 14 is set to be 4T. When a land is recorded the control signal 13, and hence the power of the radiation beam, is set to a bottom power level $P_0$ during a bottom power irradiation period, the duration of which is related to the corresponding 'low' period in the data signal 10. In this example the duration of the bottom power irradiation periods 151, 152 and 153 is set to be 3T, 4T and 5T, respectively.

When a mark is recorded following a bottom power irradiation period 151 corresponding to a 'low' period 121 of 3T, the control signal 13, and hence the power of the radiation beam, is set to a first intermediate power level $P_1$ for the duration of a first intermediate power irradiation period 161. When a mark is recorded following a bottom power irradiation period 152 corresponding to a 'low' period 122 of 4T, the control signal 13 is set to a second intermediate power level $P_2$ for the duration of a second intermediate power irradiation period 162, and when a mark is recorded following a bottom power irradiation periods 153 corresponding to a 'low' period 123 of 5T, the control signal 13 is set to the write power level Pw for the duration of a third intermediate power irradiation period 163. When a mark is recorded following a bottom power irradiation period corresponding to a 'low' period of from 6T to 11T, the intermediate power level is also set to the write power level $P_w$. Although the duration of the intermediate power irradiation periods 161, 162 and 163 may be different, reduction of the jitter is obtained when they all have value equal to T/4.

FIG. 2a shows a data signal 20. When this data signal 20 is recorded on an optical record carrier, the 'high' periods 211, 212 and 213 are recorded as marks and the 'low' periods 22 are recorded as lands (e.g. unwritten areas between the marks). The time length of these periods in the data signal are expressed by the number of periods, T, of a reference clock in the data signal. In this example, the time length of the 'high' periods 211, 212 and 213 is 3T, 4T and 5T, respectively. The time length of the 'low' periods 22 is 4T.

FIG. 2b shows a control signal 23 for controlling the power of the radiation beam. When a land is recorded the control signal 23, and hence the power of the radiation beam, is set to a bottom power level $P_0$ during a bottom power irradiation period, the duration of which is related to the corresponding 'low' period 22 in the data signal 20. In this example the duration of the bottom power irradiation period 152 is set to be 4T. After the bottom power irradiation period 152 the control signal 23 is set to an intermediate power level $P_2$ for the duration of an intermediate power irradiation period 162. When the duration of the bottom power irradiation period changes, the setting of the intermediate power level changes accordingly as explained during the discussion of FIG. 1.

The duration of the write power irradiation period is related to the corresponding 'high' period 211, 212 and 213 in the data signal 20. In this example the duration of the write power irradiation periods 241, 242 and 243 is set to be 3T, 4T and 5T, respectively.

When a mark corresponding to a 'high' period 211 of 3T is recorded, the control signal 23, and hence the power of the radiation beam, is set to a first raised write power level Pw for the duration of a first write power irradiation period 421. When a mark corresponding to a 'high' period 212 of 4T is recorded, the control signal 23 is set to a second raised write power level $P_{R2}$ during a second portion 2422 of a second write power irradiation period 422 and to the write power level $P_W$ during a first portion 2421 of the second write power irradiation period 242. When a mark corresponding to a 'high' period 213 of 5T is recorded, the control signal 23 is set to the write power level $P_W$ for the duration of a third write power irradiation period 423. When a mark corresponding to a 'high' period of from 6T to 11T is recorded, the control signal 23 is also set to the write power level $P_w$ during the write power irradiation period.

Figure 3:
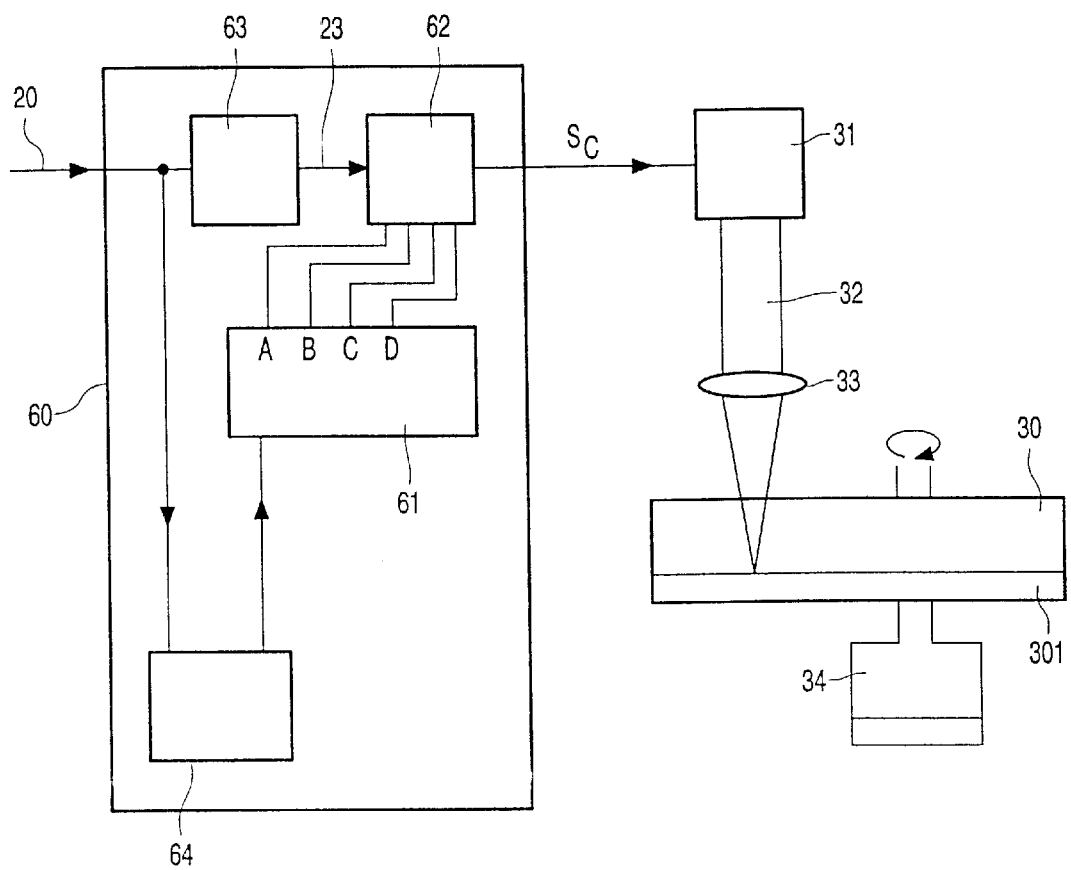
FIG. 3 shows a diagram of an optical recording device according to the invention.

FIG. 3 shows an optical recording device according to the invention for recording a data signal 20 on the recording surface 301 of a disc-shaped optical record carrier 30. The optical record carrier is rotated around its center by a motor 34. A radiation beam 32 is generated by a radiation source 31 and focused onto the recording surface 301 by a lens 33.

The data signal 20 is connected to control means 60. A current source 61 within the control means 60 has four outputs, A, B, C and D. Output A provides a current which, when fed to the radiation source 31 through a control signal $S_C$, will produce the radiation beam 32 having a write power level $P_W$. Likewise, outputs B, C and D provide 30 currents resulting in the raised write power level, the bottom power level $P_0$ and the intermediate power level, respectively. The current of each output A, B, C and D can be selected by a switch-unit 62 within the control means 60. The switch-unit 62 is operated by a pattern generator 63 controlled by the data signal 20. The pattern generator 63 transforms the data signal 20 into a control signal 23.

The control means 60 also comprise setting means 64 for setting the current of the outputs B and D of the current source 61. The current of output B of the current source 61 is set in dependence on the length of the 'high' period, 211, 212 and 213, to be recorded. Thus, by setting the current of output B, the raised write power level is set in dependence on the length of the mark to be recorded. The current of output D of the current source 61 is set in dependence on the length of the 'low' period 22 preceding the 'high' period to be recorded. Thus, by setting the current of output D, the intermediate power level is set in dependence on the length of the land preceding the mark to be recorded.

FIG. 3 shows an embodiment of an optical recording device according to the invention. However, it will be apparent to those skilled in the art that embodiments of an optical recording device using more power levels can be realized by adding further outputs to the current source 61 and by extending the switch-unit 62. Moreover, it will be apparent that a single output B, respectively D, of the current source 61 providing a varying current can, as an alternative, be replaced by several outputs, each providing a different current, while the setting means 64 select the appropriate output for setting the raised write power level and the intermediate power level, respectively, at any time.

What is claimed is:

1. An optical record carrier recording method for forming marks and lands by applying a radiation beam to a recording surface of an optical record carrier, the radiation beam for each mark to be recorded being set to at least one write power level capable of forming a mark during a write power irradiation period and being set for each land section between the marks, to at least one bottom power level incapable of forming a mark during a bottom power irradiation period characterized in that the radiation beam is set to at least one intermediate power level after the bottom power irradiation period and before the write power irradiation period, the intermediate power level being higher than the bottom power level and having a magnitude that depends on a time length of the preceding bottom power irradiation period.

2. The method of claim 1, said marks having a time length of nT, where T represents the time length of one period of a reference clock in a data signal and n represents a predetermined natural number, and wherein the radiation beam is set to the intermediate power level during an intermediate power irradiation period, characterized in that the time length of the intermediate power irradiation period is substantially equal to ¼T.

3. The method of claim 1, said marks having a time length of nT, where T represents the time length of one period of a reference clock in a data signal and n represents a predetermined natural number, characterized in that an intermediate power level following a first bottom power irradiation period having a time length of (n+1)T is set to be larger than or equal to an intermediate power level following a second bottom power irradiation period having a time length of nT.

4. The method of claim 3, wherein:

an intermediate power level following a first bottom power irradiation period having a time length of 3T is set within a range of from 0.50 to 0.80 times the write power level;

an intermediate power level following a second bottom power irradiation period having a time length of 4T is set within a range of from 0.75 to 0.95 times the write power level; and an intermediate power level following a third bottom power irradiation period having a time length of mT, where m represents a predetermined natural number larger than 4, is set so as to be substantially equal to the write power level.

5. The method of claim 1, said marks having a time length of nT, where T represents the time length of one period of a reference clock in a data signal and n represents a predetermined natural number, wherein the radiation beam for each mark to be recorded, having a time length of wT, where w represents a predetermined natural number larger than 2, is set to a write power level capable of forming a mark, and wherein the radiation beam for each mark to be recorded, having a time length of uT, where u represents a predetermined natural number lower than w, is set to a first raised write power level capable of forming a mark, the first raised write power level being higher than the write power level and being set in accordance with a time length of the mark to be recorded, and wherein the radiation beam for each mark to be recorded, having a time length of vT, where v represents a predetermined natural number lower than w and higher than u, is set to the write power level during a first portion of a write power irradiation period and to a second raised write power level during a second portion of the write power irradiation period, the first portion preceding the second portion and the second raised write power level being higher than the write power level and being set in accordance with a time length of the mark to be recorded.

6. The method of claim 5, wherein u equals 3 and w represents a predetermined natural number larger than 4, and wherein the first raised write power level is set, when recording a mark having a time length of uT, within a range of from 1.05 to 1.15 times the write power level ($P_W$), and wherein the second raised write power level is set, when recording a mark having a time length of 4T, within a range of from 1.00 to 1.08 times the write power level.

7. An optical record carrier recording method for forming marks and lands by applying a radiation beam to a recording surface of an optical record carrier, the marks having a time length of nT, where T represents the time length of one period of a reference clock in a data signal and n represents a predetermined natural number, wherein the radiation beam for each mark to be recorded, having a time length of wT, where w represents a predetermined natural number larger than 2, is set to a write power level capable of forming a mark, and wherein the radiation beam for each mark to be recorded, having a time length of uT, where u represents a predetermined natural number lower than w, is set to a first raised write power level capable of forming a mark, the first raised write power level being higher than the write power level and being set in accordance with a time length of the mark to be recorded, and wherein the radiation beam for each mark to be recorded, having a time length of vT, where v represents a predetermined natural number lower than w and higher than u, is set to the write power level during a first portion of a write power irradiation period and set to a second raised write power level during a second portion of a write power irradiation period, the first portion preceding the second portion and the second raised write power level being higher than the write power level and being set in accordance with a time length of the mark to be recorded, and wherein for each land section between the marks the radiation beam is set to at least one bottom power level incapable of forming a mark during a bottom power irradiation period.

8. The method of claim 7, wherein u equals 3 and w represents a predetermined natural number larger than 4, and wherein the first raised write power level is set, when recording a mark having a time length of uT, within a range of from 1.05 to 1.15 times the write power level, and wherein the second raised write power level is set, when recording a mark having a time length of 4T, within a range of from 1.00 to 1.08 times the write power level.

9. An optical recording device for recording data in the form of marks and lands on a recording surface of an optical record carrier by irradiating the recording surface by means of a radiation beam, the device comprising a radiation source for providing the radiation beam and control means for controlling the power of the radiation beam that it has at least one write power level capable of forming a mark during a write power irradiation period and that it has at least one bottom power level incapable of forming a mark during a bottom power irradiation period, characterized in that the control means are operative to control the power of the radiation beam such that it has at least one intermediate power level after the bottom power irradiation period and before the write power irradiation period, and that the control means are operative to set the magnitude of the intermediate power level in dependence on a time length of the preceding bottom power irradiation period.

10. The optical recording device of claim 9, said marks having a time length of nT, where T represents the time length of one period of a reference clock in a data signal and n represents a predetermined natural number, characterized in that an intermediate power level within a range of from 0.52 to 0.78 times the write power level when the intermediate power level follows a first bottom power irradiation period having a time length of 3T, and such that is has an intermediate power level within a range of from 0.78 to 0.92 times the write power level when the intermediate power level follows a second bottom power irradiation period having a time length of 4T, and such that it has an intermediate power level substantially equal to the write power level when the intermediate power level follows a third bottom power irradiation period having a time length of mT, where m represents a predetermined natural number larger than 4.

11. An optical recording device for recording data in the form of marks and lands on a recording surface of an optical record carrier by irradiating the recording surface by means of a radiation beam, the marks having a time length of nT, where T represents the time length of one period of a reference clock in a data signal and n represents a predetermined natural number, the device comprising a radiation source for providing the radiation beam and control means for controlling the power of the radiation beam such that it has a write power level capable of forming a mark when recording a mark having a time length of wT, where w represents a predetermined natural number larger than 2, and such that it has a first raised write power level capable of forming a mark when recording a mark having a time length of uT, where u represents a predetermined natural number lower than w, the first raised write power level being higher than the write power level and being set in accordance with a time length of the mark to be recorded, and such that it has a write power level during a first portion of a write power irradiation period and has a second raised write power level during a second portion of the write power irradiation period when recording a mark having a time length of vT, where v represents a predetermined natural number lower than w and higher than u, the first portion preceding the second portion and the second raised write power level being higher than the write power level and being set in accordance with a time length of the mark to be recorded, and such that it has bottom power level incapable of forming a mark during a bottom power irradiation period between the marks.

12. The optical recording device of claim 11, wherein u equals 3 and w represents a predetermined natural number larger than 4, and wherein the control means are operative to control the power of the radiation beam such that it has a first raised write power level within a range of from 1.05 to 1.15 times the write power level when recording a mark having a time length of uT, and such that it has a second raised write power level within a range of from 1.00 to 1.08 times the write power level when recording a mark having a time length of 4T.

* * * * *

UNITED STATES PATENT AND TRADEMARK OFFICE
CERTIFICATE OF CORRECTION

PATENT NO.   : 6,574,178 B2
DATED        : June 3, 2003
INVENTOR(S)  : Benno Tieke and Robert Woudenberg It is certified that error appears in the above-identified patent and that said Letters Patent is hereby corrected as shown below:

<u>Title page,</u>
Item [73], Assignee, after "Koninklijke" insert -- Philips --.

Signed and Sealed this

Sixteenth Day of September, 2003

JAMES E. ROGAN
*Director of the United States Patent and Trademark Office*